April 6, 1965  W. BROOKE ETAL  3,177,419
ELECTRIC CONTROL DEVICES
Filed Jan. 30, 1961  3 Sheets-Sheet 1

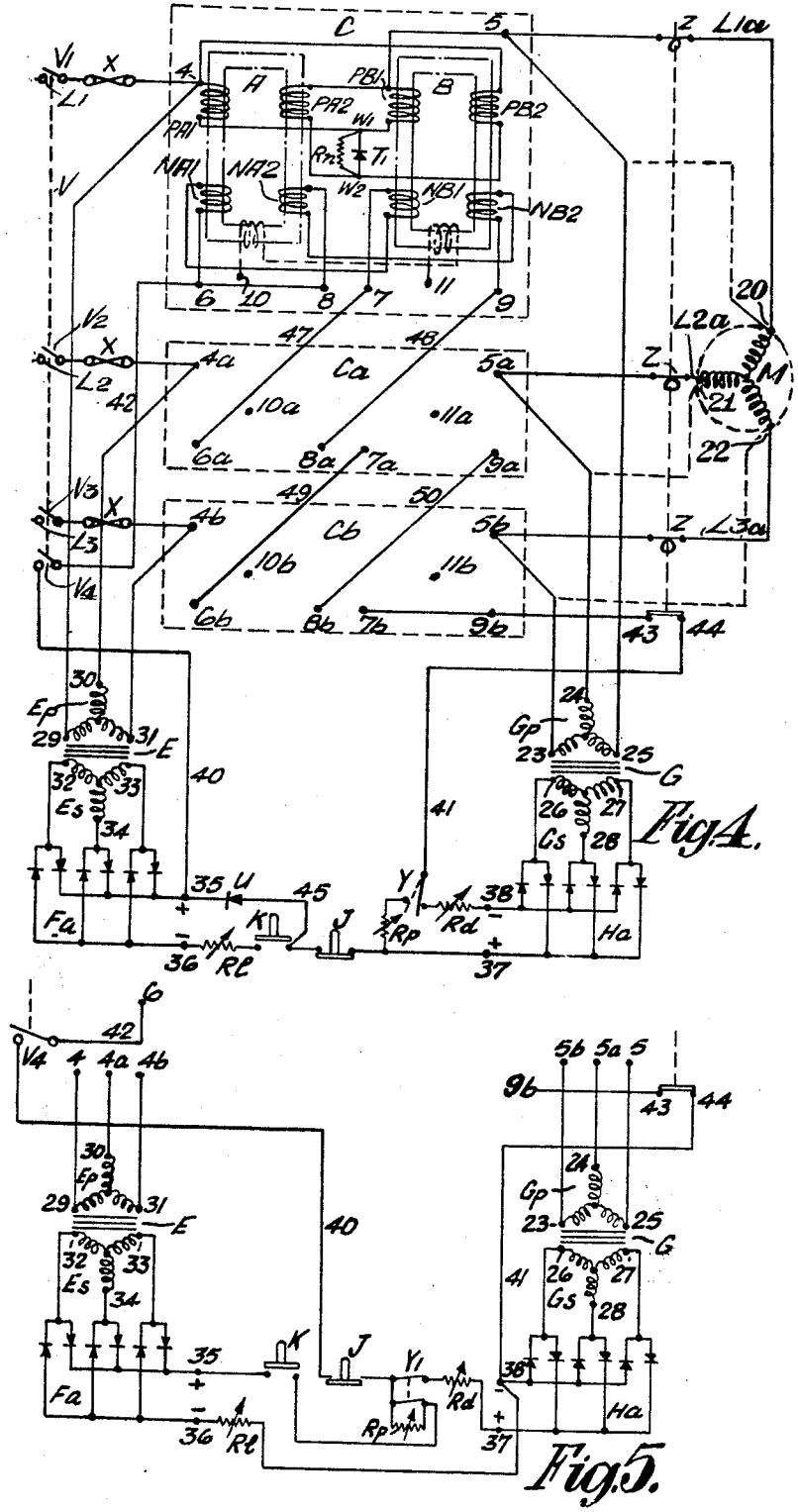

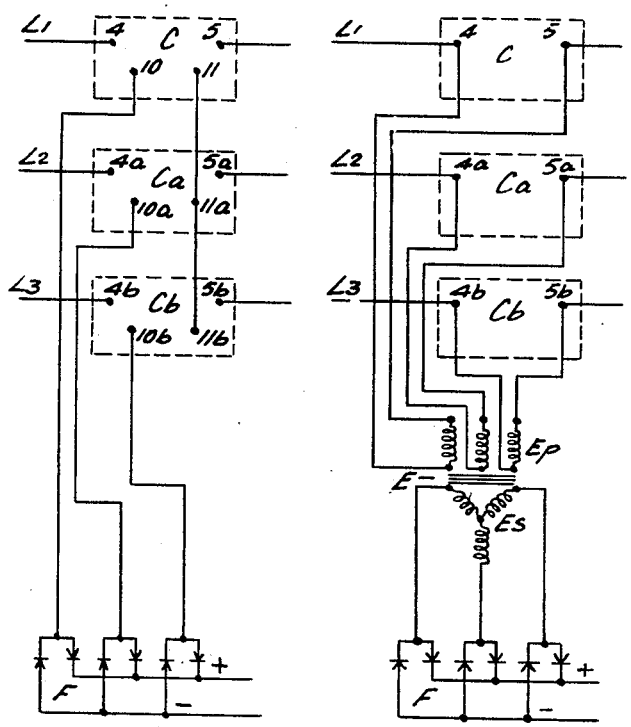
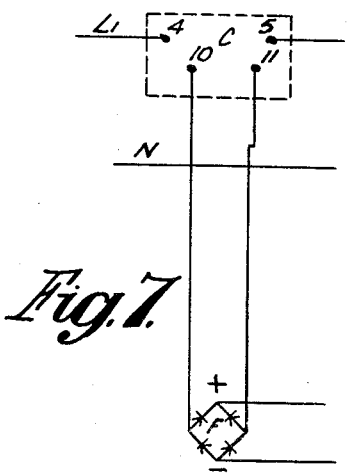
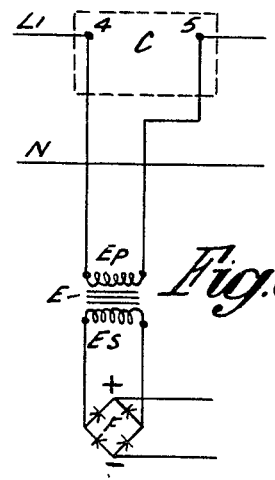

United States Patent Office 3,177,419
Patented Apr. 6, 1965

3,177,419
ELECTRIC CONTROL DEVICES
Wilfrid Brooke, 13 Carlton Road, Hale, Cheshire, England, and Harry Howe, Three Ways, Chapel Lane, Hale Barns, Cheshire, England
Filed Jan. 30, 1961, Ser. No. 85,835
Claims priority, application Great Britain, Feb. 12, 1960, 5,011/60
12 Claims. (Cl. 318—513)

This invention relates to improvements in electric remote control devices of the saturable reactor type where the latter are employed for controlling single or polyphase electric power supplies to, for example, motors and other apparatus with which the devices are directly or indirectly connected in series, and more particularly where such devices are employed for establishing or disestablishing a supply to such circuits which are permanently closed without the necessity of making or breaking the main current, and using apparatus such as described in our application No. 23,815 now Patent No. 3,054,944, or their equivalent.

The object of the invention is to provide in apparatus of the kind referred to an effective form of push button remote control through which means for protecting the circuit being controlled together with the apparatus operating therein are realised by providing one or more of the following: (1) no volt protection, (2) inching, (3) overload protection, (4) short circuit prevention and protection, (5) phase failure protection, (6) safe means of isolation—within the normal interpretation of these terms. As, however, in the type of remote control devices described there are no moving parts available and no operational breaking of the main current through which those protections may be effected, it is the aim of the invention to provide such protections as outlined without introducing equivalent moving parts in the form of auxiliary relays or electro-mechanical circuit breaking devices.

According to the invention, a saturable reactor arrangement of the type described in our application referred to or of any similar or conventional type is connected in series with, for example, a squirrel cage motor to an A.C. single or polyphase supply system and provided with the usual arrangements whereby supplementary excitation may be applied to the reactor or reactors in order to reduce the impedance of same thus enabling sufficient current to pass to start the motor or conversely to increase the impedance of the reactors thereby reducing the current to a sufficiently low value to stop the motor by interrupting the supplementary excitation supply and there are provided two supplementary excitation sources of rectified A.C. supply, one being provided from the "supply" side of the reactor system or its equivalent which would normally always be available, at least during the starting period of the motor, and the other from the "load" side of same which would only become available when and whilst the motor is running, that is to say, when the voltage has become transferred to the motor from the reactor system.

Where the equipment is arranged for three-phase operation it is assumed that three reactors would be employed in "star" connection as shown or described in our application referred to or alternatively two reactors in "open-delta" connection with the motor windings.

Whilst the two excitation sources of rectified A.C. supply are assumed to be derived from a single phase supply system when the apparatus is being operated from such a supply system it is desirable that where the apparatus is operating on a polyphase supply system that the two rectified excitation supplies are also derived from polyphase sources.

The two excitation sources of supply are mutually interlocked by being connected in series or in parallel on the D.C. side during starting so that when supplementary excitation is applied to the reactor system from the supply side source by closing a normally open "start" push button switch the impedance of the reactor or reactors which is normally high in the unexcited condition now becomes low, and the A.C. voltage across same becomes transferred to the motor which starts up, whilst the load side excitation supply source now and for the time being becomes a supply source which automatically takes over the excitation of the reactor in place of the original supply source when the "start" push button is released, meantime the motor continues to run whilst the reactor is thus self-excited. A normally closed "stop" button is provided in the excitation circuit which, when pressed, opens the latter and de-energises the reactor whereupon its impedance rapidly rises to its previously high unexcited value, and the A.C. volts across the motor largely disappears and reappears across the reactor and the motor consequently stops, since the load side source of excitation is now no longer alive and the motor can only be re-started by pressing the "start" button through which the reactor is excited from the supply side source of supply, hence if there is a voltage failure the motor having stopped will not involuntarily restart when the supply is reinstated, thus providing no-voltage protection as it is normally understood.

If the supply and load side rectified sources of supplementary excitation are connected in series whilst the start button is pressed, an increasingly powerful starting torque is provided during the accelerating period of the motor if the "start" button is maintained depressed until full speed of the motor has been attained, due to the fact that the excitation from the supply side source is boosted by that from the load side source as the voltage is transferred from the reactor to the motor as the two excitation supply voltages are additive during this period, whereupon on releasing the "start" button the supply side excitation source no longer contributes to the excitation of the reactor which now draws its excitation from the load side source only which for the time being is alive from the voltage across the motor whilst the latter is running.

If the two rectified excitation supply sources are connected in parallel during starting the load side source takes over from the supply side source when the motor has accelerated to full speed, and the supply side source becomes disconnected on releasing the "start" button through which the excitation from the latter is applied. Unlike the series connected arrangement the two supplies do not boost each other.

The supply side excitation may be derived from a transformer the primary windings of which may be connected across the incoming supply lines or their equivalent or may alternatively be connected across the or each of the reactors or as a further alternative a suitable secondary winding may be provided on the or each reactor and connected directly to the supply side rectifier system thereby dispensing with the supply side transformer. The supply and load side excitation may be still connected in series or parallel during starting but in the case of the two latter alternatives no boost feature during starting is available since the excitation supply voltage from these sources diminishes to zero as the motor runs up to speed.

Overload protection may be provided by the employment of conventional overload devices either of the thermal or electro-magnetic type which are arranged to open the excitation circuit only of the reactor when an overload occurs whilst the motor is running, the operation being equivalent to the pressing of the "stop" button, as already described, thus the motor stops due to the rapid increase in the impedance of the reactor and the consequent reduction in the current to magnetising current value, and will not restart involuntarily in view of the no-volt protection features provided, although the main circuit still remains unopened.

In conventional devices it is the usual practice to rely upon circuit breakers or fuses of high rupturing capacity for cutting off the supply on the advent of short circuits, and in either case the object of such protective devices is to open the main circuit. As, however, in such cases there is little—if anything—in the circuit to limit the rise of current on the appearance of a short circuit and as a measurable time elapses between the appearance of the fault and the actual opening of the circuit by whatever means are employed, the current may and often does rise to dangerous levels. There is also the equally dangerous hazard of reclosing the circuit whilst still in fault due to the difficulty of knowing when, or if, the fault has been removed or has removed itself.

Whilst circuit breakers usually break all the supply phases simultaneously on a polyphase system even on unbalanced faults—that is to say where only one phase is faulted—no such mutual interlock is normally available between fuses if the latter are employed for overload protection, in that, if as is often the case only one fuse blows, the polyphase supply immediately becomes a single phase one with its obvious dangers where polyphase motors are operating, thus the application of fuses for motors are operating, thus the application of fuses for fault protection is somewhat limited in circuits wherein polyphase motors operate in the absence of some form of phase-failure protection which is not easy to arrange with conventional control apparatus.

One of the objects of the invention is to provide means for preventing heavy short-circuiting currents.

During the working condition of the reactors they are excited from the load side source of excitation supply and therefore a short circuit fault on the closed ply and therefore a short circuit fault on the closed circuit controlled by the said reactors will also short circuit that excitation supply source to same causing the excitation to collapse and the impedance of the reactors to rise and reduce the main current passing through them to magnetising current level, thus disestablishing the supply to the motor or consuming circuit by causing the transference of the supply voltage from the latter to the reactors, which will apply to apparatus operating on either single phase or polyphase supply systems under such circumstances, hence a short circuit becomes self-effacing in that instead of reducing the impedance of the circuit it actually increases it to virtually cut-off the current.

Where however, the apparatus is operating on a polyphase supply system a short circuit may occur across only a part of the system, for example, across a pair of phases as distinct from a balanced short circuit across all phases.

In the event however, of such an unbalanced short circuit only a corresponding part of the load side source of excitation supply will be short circuited, the effect of which would be to convert this three-phase source of excitation supply into a single phase supply—the first reaction to which would be an immediate reduction of the rectified voltage from its normal three phase value to a much lower single phase value, thus reducing the supplementary excitation to the reactors and a consequent reduction in the feedback excitation causing the impedance of the reactors to rise and the current through them to decrease, whilst the balanced impedance in the phases of the load circuit would tend to cause the unbalanced condition engendered by the fault to become more balanced as far as the short circuiting of the load side source of excitation is concerned. This is more particularly so if a motor forms the whole or part of the consuming circuit, since as the voltage is transferred from the motor to the reactors due to the rise in impedance of the latter that of the motor immediately decreases to a low value of approximately the ohmic resistance of the windings and thus becomes equal to a short circuit irrespective of whether or not the motor is at standstill and which causes a more effective collapse of the load side source of excitation in circumstances of unbalanced faults.

Whilst in the fault conditions described the circuit becomes quickly disestablished without any appreciable rise in current during the operation, it is a further feature of the invention that on attempting to re-establish the supply when or whilst a short circuit fault exists, no dangerous or abnormal currents arise such as are expected to be encountered with conventional types of switchgear. The currents likely to flow in such circumstances are limited by the impedance level of the reactor system according to the excitation level applied at starting and is not likely to appreciably exceed starting or initial current values. This is due to the harmonic impedance of the reactor system and the saturating influence of the feed-back excitation and the harmonic frequencies thereby created in the wave form of the current passing in the load circuit as a result of the short circuit condition.

Protection against "phase failure" is provided in the equipment when the excitation circuits are arranged in the manner already described, this form of protection being of importance chiefly where motor operation is concerned. The action of the arrangement is simliar in principle to that produced by unbalanced short circuits as described, in that, if an open phase develops between the supply source and the reactors, the three phase supply immediately becomes a single phase supply—with the result that the load side source of rectified excitation supply becomes reduced in the manner already described from a three phase level to its much lower single phase equivalent, and the immediate rise in the impedance of the reactors causes a transfer of voltage from the load circuit to the reactors and disestablishes the supply provided that the motor is loaded or partly loaded, that is to say, when the impedance of the load circuit is sufficiently able to assist in restoring the balanced condition of the excitation supply source causing same to collapse more completely and the motor stops—thus preventing the latter running on one phase in an overloaded condition with danger of burn-out.

It should be pointed out that the phase failure protection is not effective when the motor is running light in that the latter will continue to run light on single phase, in which condition no danger exists, but a small load current of approximately half load valve will provide a sufficiently balanced condition in the load side excitation to shut down the motor and the protection ensures that the motor windings cannot become thermally overloaded which is its objective.

Phase failure is provided against lack of continuity of the circuit connections up to the point where the load side source of excitation supply is situated which would normally include the reactors and anything on the supply side thereof. If the whole circuit on the load side of the reactors is to be protected up to the terminals of the motor all that is necessary is to connect the primaries of the load side three-phase potential transformer direct to the motor terminals when the protection would be operative right up to the motor.

Phase failure protection is a feature of particular importance, as only where this is provided can fuses be safely employed in the three-phase motor control systems, since there is otherwise no means of providing an interlock ensuring that the blowing of one fuse would completely disestablish the supply in all three phases.

Whilst there is no necessity to break any main current in any operational capacity fuses may be employed for overload protection if desired, on the grounds of their being cheaper than overload relays in view of the provision of phase failure protection, as described. There is however, no point in employing fuses for short circuit protection with apparatus of the kind described, as both are intended to perform the same function but the reactor arrangement operates much quicker, and thus forestalls the operation of the fuses.

Safe means of isloation are provided by arranging an auxiliary blade on the isolating switch which breaks earlier and makes later than the main blades ensuring that the main circuit can only be broken or made when the impedance of the reactor system is of maximum valve that is to say when they are unexcited.

Embodiments of the invention will now be described with reference to the accompanying drawings in which:

FIGURES 4 and 5 show corresponding arrangements as applied to inductive devices operating on a three phase supply system, FIGURES 6, 7, 8 and 9 are schematic diagrams showing alternative arrangements for providing the supply side excitation for single and three phase systems.

Figure 1:
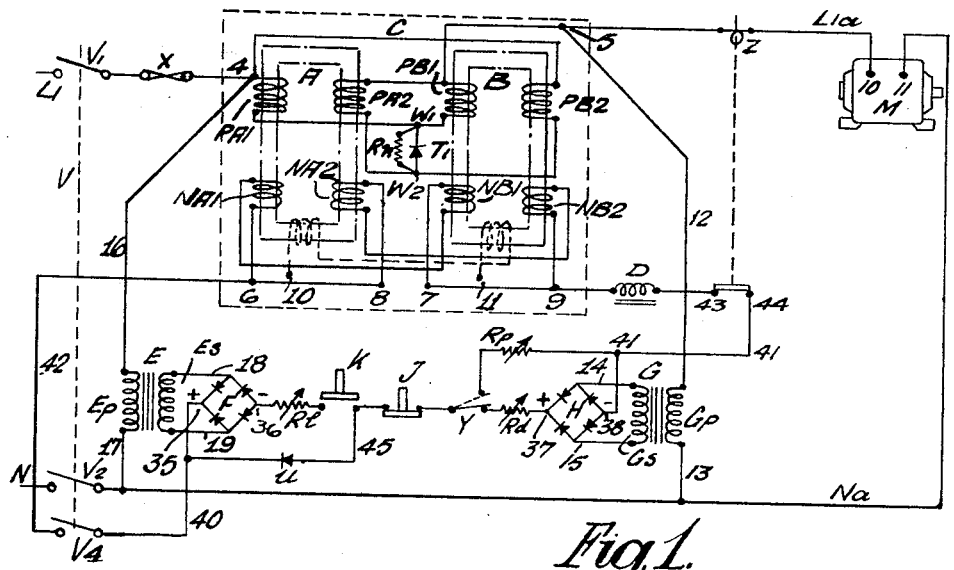
FIGURES 1 and 2 and 3 are circuit diagrams showing typical applications of the protection on inductive devices operating on a single-phase supply system.

Referring to FIGURE 1, there is shown a saturated reactor arrangement such as is described in our application No. 23,815 wherein a reactor C comprises cores A and B on which are provided the main windings PA1, PA2, PB1 and PB2 connected between the terminals 4 and 5, and the excitation windings NA1, NB1, NA2 and NB2 between terminals 6–7 and 8–9 the reactor operating in series with a squirrel cage motor M from a single phase supply source L1–N, that is to say, between phase and neutral of a three-phase supply system where the neutral is usually earthed or on an equivalent single phase supply. An isolating switch V is shown having a main blade V1 in the main supply lead L1 and a blade V2 in the return lead N and an auxiliary blade V4 for breaking the control circuits of the reactor, ahead of the main blades.

A single-pole conventional type overload relay Z is shown, the operating coil of same being connected in the lead between the reactor and the motor. Two potential transformers are shown at E and G, the former having its primary winding Ep connected across the live supply source between terminal 4 and the neutral lead Na through connections 16 and 17 which produces an output voltage from secondary windings Es, providing a rectified source of excitation supply through bridge rectifier F to which it is connected by connections 18 and 19—this will be referred to as the supply side source of excitation supply and is available always when the supply system is alive.

Transformer G is arranged with its primary winding Gp energised from the dead side or motor side of the reactor C between terminal 5 and the neutral lead Na through connections 12 and 13 respectively. This provides an ancillary source of excitation supply through secondary winding Gs and bridge rectifier H connected thereto by connections 14 and 15. The source of supply from the latter is available only when the motor M is running and will be referred to as the load side source of excitation supply. The two sources of supply are interlocked, in that they are connected in series during starting so that when excitation is applied to the reactor from the supply side source of supply a return is made through the load side rectifier system and that when the motor speeds up, the excitation of the reactor is taken over by the load side source of supply which has now become alive. The action of this may be more easily followed by reference to FIGURE 1, as follows: A normally open "start" push button K and a normally closed "stop" button J are shown and also a change-over control switch Y—the latter being shown in the normal running position. Assuming now that the isolating switch V is closed and an excitation supply side supply source is available at the positive and negative terminals 35 and 36 of the bridge rectifier F. When the "start" button K is pressed a rectified excitation supply current will flow from the positive terminal 35 of rectifier F, through connection 40, through the auxiliary blade V4 on the isolating switch V, through connection 42 to the terminals 6–8 of the supplementary excitation winding system on the reactor C to terminals 7–9, through a choke D, through the normally closed contacts 43–44 of the overload relay Z, through connection 41 to the negative terminal 38 of the load side rectifier H, through the two branches of this bridge rectifier to the positive terminal 37 of same, through variable resistance Rd, through the change-over switch Y, normally closed "stop" button J—through the "start" button K which is still held depressed, through resistance R1 to negative terminal 36 on supply side rectifier F, whereupon the reactor C becomes excited and the impedance of same becomes reduced in the manner as described in our application No. 23,815 and the motor M starts up and accelerates to full speed, and almost the whole of the supply voltage which hitherto existed across the terminals 4 and 5 of the reactor now appears across terminals 10 and 11 of the motor M, whilst the voltage across the terminals 4 and 5 of the reactor is correspondingly low. Under these circumstances, the voltage across the primary winding Gp of the load side transformer G which was virtually zero when the motor was standing, is now almost equal to the supply volts—that is to say—it receives the same voltage as the motor with which it is in parallel, thus maximum excitation supply volts now appear across the positive and negative terminals 37 and 38 of the load side rectifier H and due to the two excitation supply sources being connected mutually in series they become additive as the motor accelerates thereby providing a boost excitation during starting which produces an increasing starting torque. When the button K is released the excitation supply voltage from the load side rectifier H flows from the positive terminal 37 of same through the variable resistance Rd through change-over switch Y through "stop" button J, through connection 45, through a single-wave bypass rectifier U provided for the purpose of bypassing the rectifier F when the start button K is open, through connection 40, auxiliary switch blade V4 connection 42 to terminals 6–8 on the reactor C through the excitation windings thereon to terminals 7–9, through the choke D, contacts 43–44 of the overload relay Z through connection 41—back to the negative terminal 38 of the rectifier H, thus the motor M will continue to run until the "stop" button J is pressed which breaks the excitation circuit and is followed by a rise in the impedance of the reactor C across terminals 4 and 5 and a transference of the voltage across terminals 10 and 11 of the motor M to the latter, and the motor will stop and will not restart until the "start" button K is again pressed. This arrangement provides the no-volt protection feature referred to earlier, since when the motor is running after having been started by the "start" button K and there is a failure of supply, the motor will stop in a manner equivalent to the "stop" button J having been pressed except that there is no transference of volts from the motor to the reactor as the volts are now non-existent. On reinstatement of the supply volts practically the whole of the latter will appear across the terminals 4 and 5 of the reactor due to the high impedance developed by the latter and the motor M will not restart until the "start" button K is pressed, thus according to the invention an effective form of push button control has been provided through which no-volt protection has been realised.

The variable resistance R1 and Rd in the excitation supply circuits are provided for the purpose of varying the excitation supply voltage of the supply side and load side sources respectively, the former controlling the rate of acceleration during starting and thus enabling the starting current to be reduced or increased to required values whilst the latter resistance controls the impedance level at which the reactor works when the motor is running and consequently determines the voltage across the motor terminals when the latter is running under load.

"Inching" control is a usual requirement in connection with remote control systems where small amounts of motion are required from the motor for adjustment and setting up purposes of the equipment which the motor is intended to drive so that the motor will respond to the pressing of a button for starting and stopping it as distinguished from the normal use of the "start" button which starts the motor but does not stop it.

This is usually achieved through some form of relay system and a contactor switch operated through an "inching" push button where under load conditions there is danger of the contacts of the contactor switch becoming welded together when, of course, the motor cannot be stopped by the orthodox means. According to the present invention when "inching" is required the change-over switch Y is switched over to the dotted position shown which then enables the "start" button K to be used for inching purposes, in that, if it is sharply closed and opened the motor will revolve when contact is made and will stop when the contact is broken and the amounts of motion required are determined by how long or how short is the duration of time during which contact is made by the button K. The action of the arrangement is based on the excitation supply being provided from the supply side source and that the load side source is cut out by the change-over switch Y so that the interlocking feature or the follow up by the load side source of excitation as normally provided has been interrupted the excitation being provided from the positive terminal 35 of the rectifier F, through connection 40, auxiliary switch blade V4, connection 42, terminal 6–8 on the reactor C, through the excitation winding system to terminals 7–9, through choke D, contacts 43 and 44 of the overload relay Z, connection 41, through variable resistance Rp which provides independent variation of the inching torque, through the change-over switch Y in the dotted position, through "stop" button J, through "start" button K, used as an "inching" button, through variable resistance R1 to negative terminal 36 of rectifier F, thus providing a safe method of inching control since there is no breaking of the main circuit involved from which the dangers of inching normally arises. On replacing the change-over switch to its original position as shown on the diagram the button K reverts to its original function as a "start" button and the supply side and load side excitation sources of supply become mutually interlocked again and function in the manner already described.

Figure 2:
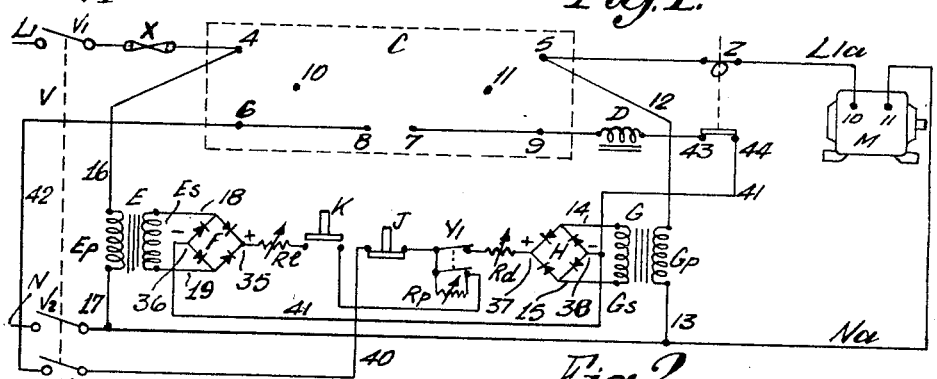

FIGURE 2 shows a variation of the arrangement of FIGURE 1, in that, the supply side and load side rectified sources of excitation supply are mutually interlocked during starting by parallel instead of series connection. This arrangement differs from the former one one only, in that, due to the parallel connection of the two excitation supply sources the bypass rectifier U shown in FIGURE 1, is omitted, since it is no longer required, and that the switch Y1 for changing over from starting to inching now becomes a double-pole "on-off" switch, the operation of the arrangement being as follows:

When the motor is standing and the reactor C unexcited the impedance of the latter is high and most of the supply volts appear across the terminals 4 and 5 of the reactor and practically none across the terminals 10 and 11 of motor M. On pressing the "start" button K an excitation current flows from the positive terminal 35 of the rectifier F from the secondary winding Es of the supply side transformer E through variable resistance R1 through "start" push button K, through the closed lower pole of the double-pole switch Y1, through stop button J, through connection 40, and auxiliary switch blade V4 of isolating switch V now closed, through connection 42 to excitation terminals 6–8 on reactor C, through the excitation winding system of the latter to terminals 7–9 through choke D, contacts 43 and 44 on overload relay Z, through connection 41 to negative terminal 36 of rectifier F, thus exciting the reactor and starting up the motor in the manner already explained by effecting a transfer of the supply volts from the reactor to the motor. The load side transformer G now receives the same voltage across primary winding Gp as does the motor with which it is now in parallel and secondary winding Gs provides normal excitation voltage through the rectifier H with which it is connected by connections 14 and 15 and thus an excitation supply now flows from positive terminal 37 on the load side rectifier H, through the variable resistance Rd and the closed upper pole of switch Y1, through "stop" button J, through connection 40, through auxiliary switch blade V4 through connection 42 to terminals 6–8 on reactor C, through the excitation winding system to terminals 7–9, through choke D and contacts 43–44 on the overload relay Z through connection 41—back to negative terminal 38 on load side rectifier H, thus providing a parallel excitation supply source to the reactor so that when the "start" button is released the load side source takes over and maintains the reactor in the excited condition during which time the motor M continues to run. If the "stop" button J is pressed or there is a failure of supply the motor will stop and cannot become restarted only through the "start" button as explained in connection with the FIGURE 1 arrangement. As the two rectified excitation sources of supply are connected in parallel during starting they are not additive as in the case of the series connected arrangement of FIGURE 1 and consequently there is no accelerating boost during starting. The inching arrangement shown in FIGURE 2 is generally similar to that described in connection with FIGURE 1, in that, on opening the switch Y1 the upper pole of same disconnects the load side source of excitation supply which otherwise provides the retaining excitation circuit and at the same time introduces the variable resistance Rp into the control circuit and the "start" button is then employed for inching purposes—the inching torque being determined by the variable resistance Rp precisely as in the FIGURE 1 arrangement.

Various alternative combinations of push buttons producing equivalent results may be used.

Figure 3:
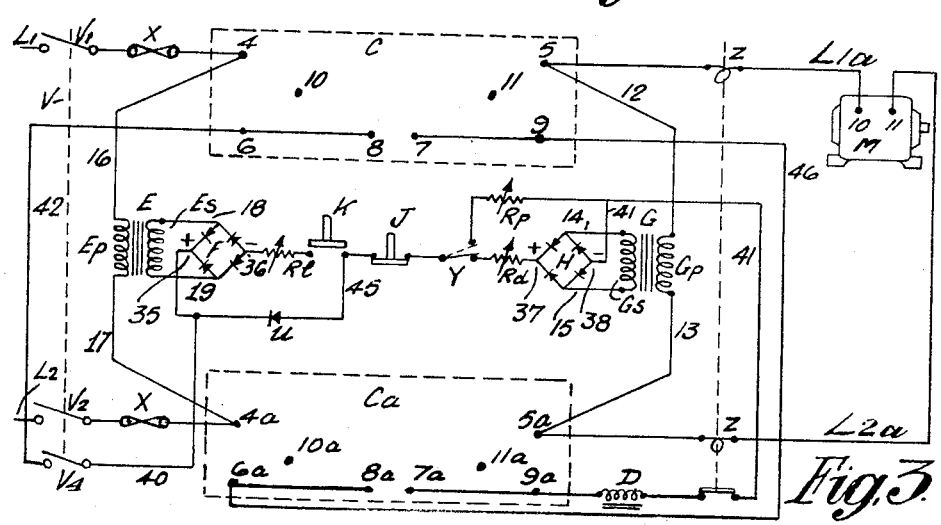

FIGURE 3 shows a similar arrangement to that of FIGURE 1, except that two reactors C and Ca each wound for half of the line voltage are employed, the former connected in the L1 supply lead and the latter in the L2 supply lead with the motor M in series with them on the load side, thus providing a double-pole equipment suitable for use across one phase of a three-phase supply system which may or may not have an earthed neutral, or on an equivalent single-phase supply.

Two sources of rectified excitation supply, are provided operating from the supply side and load side of the reactors respectively, mutually interlocked in series during starting and providing boost acceleration of the motor as already described and shown, together with the push button arrangement, but as there are now two reactors C and Ca the excitation winding systems of same are shown connected in series between terminals 7–9 on the former and 6a–8a on the latter by connection 46 but may equally well be connected mutually in parallel. The operation of the arrangement would be precisely as described and shown in connection with FIGURE 1.

A double-pole overload relay Z is provided as shown.

Whilst the supply side and load side rectified source of excitation supply are shown connected mutually in series during starting in FIGURE 3, they may alternatively be connected mutually in parallel as shown in FIGURE 2, but, as already mentioned they would then no longer be additive and consequently there would be no mutual boost feature of the two supplies.

Inching control would be obtained precisely as shown and described in FIGURE 1 or 2.

So far, the invention has been described in its application to single phase supply systems—FIGURE 4, however, shows a corresponding application of the invention to three-phase supply systems and corresponds to the FIGURE 1 arrangement. In this connection three reactors C, Ca and Cb of the type already described are employed connected one in each of the lines L1, L2 and L3 of a three-phase supply system and star connected with a squirrel cage motor M. An isolating switch V is shown having main blades V1, V2 and V3 in the main supply leads L1–L2 and L3 respectively and an auxiliary blade V4 for breaking the control circuits of the reactors in advance of the main blades. A three pole conventional type overload relay Z is shown with an operating coil in each lead between the reactors and the motor. Two three-phase potential transformers are shown at E and G, the primary winding Ep of the former from terminals 29, 30 and 31 being connected to the supply terminals 4, 4a and 4b on the supply side of the reactors C, Ca and Cb respectively, whilst the primary windings Gp of the other transformer G are connected from terminals 25, 24 and 23 on same to terminals 5, 5a and 5b on the load side of the reactors. The secondary windings Es of transformer E are connected to the three-phase supply side rectifier Fa from terminals 32–33 and 34 on same providing a supply side rectified excitation source of supply at the positive and negative terminals 35 and 36 respectively. The secondary windings Gs of transformer G are likewise connected to a three-phase rectifier Ha from terminals 26–27 and 28 on same, providing a load side rectified excitation source of supply at the positive and negative terminals 37 and 38 respectively. A normally open "start" push button K and a normally closed "stop" push button J together with the variable resistances R1, Rd, Rp, change-over switch Y and bypass rectifier U are provided precisely as in FIGURE 1 arrangement—under like references.

The excitation winding systems of the three reactors C, Ca and Cb are shown connected in series parallel open delta as fully described in our application No. 23,815 the overall excitation winding system being connected between the terminals 6 and 9b through which the three reactors are collectively excited from three-phase rectified sources. The operation of the equipment would be as follows:

On closure of the isolating switch V the three-phase supply voltage would appear across the reactor terminals 4, 4a and 4b. In the unexcited condition the reactors will develop a high impedance and a voltage of approximately phase-to-neutral value will exist across each of same—there being practically no voltage across the motor terminals 20, 21 and 22, which form a star point to the reactors since the impedance of the motor windings are negligible in the stationary position of the motor in comparison with that of the unexcited reactors.

On pressing the "start" button K the rectified excitation source of supply flows from the positive terminal 35 of the supply side rectified Fa, through connection 40 auxiliary switch blade V4, connection 42 to terminals 6–8 of the excitation winding system on reactor C, from terminals 7–9 on the latter through connections 47 and 48 to excitation winding terminals 6a and 8a respectively on reactor Ca, out from terminals 7a and 9a on the latter through connections 49 and 50 respectively to excitation winding terminals 6b–8b on reactor Cb, out from terminals 7b–9b on the latter through contacts 43–44 on overload relay Z, connection 41, through change-over switch Y in the position as shown, through variable resistance Rd to negative terminals 38 on the three-phase load side rectifier Ha, through the rectifier elements of the latter—not yet providing any output voltage—to positive terminal 37, through "stop" button J, through "start" button K now depressed, through variable resistance R1— back to the supply side rectifier Fa at negative terminal 36, thus exciting the three reactors collectively and simultaneously whereupon the impedance of same becomes reduced, as also does the supply voltage across them, which becomes transferred to the motor M which starts up. As the motor accelerates the load side transformer G—the primary windings of which are connected virtually in parallel with the motor—provides a secondary output voltage, the rectified equivalent of which appears across the terminals 37 and 38 of the three-phase load side rectifier Ha which now becomes additive to the rectified voltage existing across terminals 35 and 36 of the three-phase supply side rectifier Fa and boosting the latter and increasing the acceleration whilst the "start" button K remains depressed. When the motor has accelerated to full speed and the "start" button K is released the load side rectifier system which is now supply takes over and provides the entire excitation supply from terminals 37 and 38— the current flowing from the positive terminal 37 through stop button J, connection 45, bypass rectifier U to terminal 35, connection 40, auxiliary switch blade V4 on isolating switch V, connection 42 to terminals 6–8 on excitation winding system on reactor C, through the interconnections between the reactors Ca and Cb and out through terminals 7b–9b on the latter, through contacts 43–44 on overload relay Z, connection 41, change-over switch Y, variable resistance Rd—back to negative terminal 38 on rectifier Ha, thus maintaining the collective excitation of the reactors and the motor running.

On pressing the "stop" button J the excitation from the load side rectifier Ha is interrupted and the impedance of the reactors rise to their previously high value, as also does the supply voltage which becomes transferred from the motor back to the reactors—thus stopping the motor which can only be restarted by pressing the "start" button K. Likewise if the supply voltage fails when the motor is running and later becomes reinstated the motor will not restart unless and until the "start" button K is pressed, since the reactors will be high in impedance and practically the whole of the supply voltage will exist across them until excitation is re-applied thus providing no-volt protection generally as described in connection with the corresponding single phase arrangement of FIGURE 1.

Inching control is provided precisely as shown and described in connection with FIGURE 1 employing like parts and references.

FIGURE 5 shows a variation of the latter arrangement differing only, in that, the supply side and load side rectified sources of excitation supply are connected in parallel during starting instead of in series, and corresponds with the FIGURE 2 arrangement, the operation being precisely as described in connection with the latter wherein the same notation of the control circuit details has been employed. The overall operation is otherwise equivalent to the FIGURE 4 arrangement, except that the supply and load circuit excitation sources are not additive and consequently the boost features previously mentioned are not produced. Unless heavy starting torques are particularly required there is no object in producing boost excitation which needlessly increases the starting current.

Inching control is provided as shown and described in connection with FIGURE 2 employing like parts and references.

For the protection of the motor or load circuit against overloads conventional overload relays Z have been shown which may be either of the electromagnetic or of the thermal type. These are arranged to break the excitation circuit at present overload values at contacts 43–44 and are equivalent in such an event to pressing "stop" button J whereupon the motor will stop and can only be restarted by pressing the start button K.

As to the provision of safe means of isolation a two-pole isolating switch V has been shown in FIGURES 1, 2 and 3 for isolating the reactor system from the single-phase supply and arranged with blades V1 and V2 in supply leads L1–L2 or L1–N together with an auxiliary blade V4 arranged to cut off the excitation supply source in advance of the main blades when opening, thus ensuring that the impedance of the reactors is increased to maximum before the main blades break circuit and ensuing that the current is reduced to magnetising current level before the circuit is broken. This effectively frustrates any attempt to break load current on the isolating switch even if the latter is opened whilst the motor M is running before the "stop" button is pressed, thus ensuring that the main circuit may only be made or broken when the impedance of the reactor system is at maximum value.

Similar provision has been made in the three-phase equipment shown in FIGURES 4 and 5 wherein a three-pole isolating switch V has been provided having blades V1, V2 and V3 in the supply leads L1, L2 and L3 respectively with an auxiliary blade V4 arranged to cut off the excitation supply source in advance of the main blades when opening and providing the same features as described in connection with the single-phase equipment.

The invention has been described and shown in the accompanying illustrations employing reactors of the type described in our application No. 23,815, now Patent No. 3,054,944 but it is not intended to be restricted to these in particular and may be used in connection with reactors of the conventional type where they apply, for which purposes the terminals 4 and 5 are intended to denote the points between which the main windings exist whilst the terminals 6–8 and 7–9 are likewise intended to denote the points between which the excitation windings exist.

In the arrangement shown so far the supply side excitation is derived from the supply side transformer E the primary windings system of which is connected across the incoming supply system and the secondary output is rectified by the supply side rectifier F or Fa.

Alternative arrangements for providing the supply side excitation supply are shown in FIGURES 6, 7, 8 and 9.

In FIGURE 6, the arrangement shown differs from that in FIGURES 1, 2 and 3, in that, the primary winding Ep of supply side transformer E is energised from terminals 4 and 5 which are across the main reactor windings. In the unexcited condition of the main reactor C practically the whole of the line voltage exists across these two points. When, however, the reactor becomes excited the voltage which hitherto existed across same has now been transferred to the consuming circuit across which the load side transformer (not shown here) is connected and consequently the supply side transformer has no longer any voltage across its primary winding, this however, is of little importance, as at this stage the excitation of the reactors has been taken over by the load side excitation and the supply side excitation is no longer required until the reactors are de-energised either intentionally or as a result of a fault under which circumstances the supply side excitation is again available.

In a further alternative arrangement shown in FIGURE 7 a secondary winding is provided on the reactor C at terminals 10–11 which is connected directly to the supply side rectifier F and provides the same results as the arrangement of FIGURE 6 thus enabling the transformer E to be dispensed with. Secondary windings as described are shown in dotted outline on the reactors in FIGURES 1, 2 and 3, at terminals 10–11 and 10a–11a.

FIGURE 8 shows the polyphase arrangement corresponding to the single phase arrangement shown in FIGURE 6 in that the primary phase Ep of the polyphase transformer E are each connected across a separate reactor instead of across the supply lines.

One winding is connected across terminals 4–5 of reactor C, another across terminals 4a and 5a on reactor Ca and the remaining one across terminals 4b–5b on reactor Cb, the secondary windings Es being connected to the supply side rectifier F otherwise as in FIGURE 4.

FIGURE 9 shows a polyphase arrangement corresponding to that of FIGURE 7 in that, the supply source to the supply side rectifier F is derived from secondary windings 10–11 provided on reactor C, 10a–11a on reactor Ca and 10b–11b on reactor Cb, thus dispensing with the supply side transformer E. Secondary windings as described are also shown in dotted outline on the reactors in FIGURES 1 and 4, at terminals marked with corresponding references in FIGURE 9.

An important feature of the invention lies in the prevention of heavy short circuiting currents and the protection—whilst such fault conditions exist—afforded by the apparatus when the excitation arrangements are provided from the supply and load side sources respectively, as herein described. This operates in the following manner:

Referring to FIGURES 1 and 2, if it be assumed that the motor has been started by pressing the button K in the manner already described and that a short circuit develops between the line 5 and the neutral lead N on the load side of the reactor C, this will result in the load side potential transformer G being short circuited, since the primary winding of same is connected across these same points and hence the load side rectified excitation source of supply will immediately collapse and with it the supplementary excitation to the windings of the reactor C across terminals 6–8 and 7–9 which is the sole source of excitation to the reactor whilst the motor runs. This is immediately followed by a rise in the impedance of the reactor and a reduction of the current passing through same to approximately magnetising current level and a transfer of the supply volts from the motor M to the reactor C and consequently the motor stops. When the short circuit occurs any interim increase of current is immediately checked and reduced to magnetising current level by the rising impedance of the reactor although there is always present in the circuit the minimum impedance of the reactor which becomes a natural current limiter and experience shows that due to the rate of increase of the impedance of the reactor on short circuit no interim rise of current occurs under fully loaded conditions before collapsing to magnetising current level whilst under light load conditions the interim instantaneous current rise is appreciably less than full load values. If after the motor has stopped the start button K is pressed in an attempt to restart the motor heedless of the fact that a short circuit was the cause of the stoppage and that the fault still exists, the reactor will become fully excited from the supply side rectifier F, thereby reducing the impedance of same but not to an extent as would allow the passage of abnormal short circuit currents; such currents would be limited to approximately that of the normal starting current of the motor as determined by the amount of the applied excitation, this current limiting feature being due to the harmonic impedance of the reactor system and the saturating influence of the feed back excitation and the harmonic frequencies created in the wave-form of the current passing in the load circuit as a result of the short circuit condition.

Assuming now that the circuit is no longer faulted the motor may be restarted by pressing the start button K in the normal manner as already explained.

The behaviour of the arrangement shown in FIGURE 3, would be similar to that described above.

In reference to FIGURES 4 and 5 which show diagrammatically the polyphase equivalent of the arrangements shown in FIGURES 1, 2 and 3 the functioning of the apparatus would be precisely as described in connection in FIGURES 1, 2 and 3. Assuming the motor M has been started by pressing the start button K and that a balanced short circuit develops across all the three lines 5, 5a and 5b between the reactors and the motor M, the three phase load side transformer G will become short circuited also and the load side rectified excitation source of supply to the reactors will accordingly collapse thereby increasing the impedance of the reactors and in turn reducing the current passing through them to magnetising current level and the supply volts will become transferred from the motor to the reactors and the motor will stop.

As in the single phase arrangement described, there will be little or no momentary rise of current when the short circuit appears as this is immediately checked by the rising impedance of the reactors and reduced to magnetising current level, as already described.

If after the motor is stopped the start button K is pressed whilst the fault still prevails the reactors will become fully excited from the supply side rectifier Fa, thereby reducing the impedance to a limited extent whereby due to the harmonic impedance of the reactor system brought about by the short circuit condition as already explained, the current permitted to flow becomes limited to approximately that of the starting current of the motor as determined by the amount of the applied excitation.

Assuming as before that the motor M is running after having been started up in the normal way by pressing the start button K and that an unbalanced short circuit arises across any pair of phases between the reactors and the motor, as for example, across terminals 5, 5a or anywhere between there and the terminals 20 and 21 on the motor M, the effect of the short circuiting of one phase is virtually to change the three phase supply into single phase and thus the excitation supply source through the transformer G becomes converted also to single phase —resulting in a considerable reduction in rectified average output voltage between three phase and single phase rectification, as is well known. This causes a partial collapse of the supplementary and feedback excitations to the reactors which results in an immediate increase in the impedance of the latter and a consequent transference of voltage from the motor back to the reactors whereupon the motor quickly stops. During the process of stopping of the motor and the transfer of volts therefrom the impedance of the motor decreases immediately to a very low value causing the unbalanced short circuit to become a practically balanced one—since the low impedance of each phase of the motor windings amounts to little more than the ohmic resistance of its windings which causes the load side excitation supply source to ultimately become as completely short circuited as in the case of the balanced fault.

If the button K is pressed in an attempt to apply power to the motor ostensibly to restart it whilst the unbalanced fault condition still prevails the reactors will become fully excited from the supply side rectifier Fa thereby reducing the impedance of the reactor in the faulted phase and the position would be otherwise as described in connection with the balanced short circuit condition.

Protection against phase failure or single-phasing is provided in the three phase equipment when the excitation features are arranged in the manner shown in FIGURES 4 and 5 and thus fuses may be employed for overload protection on the grounds of cheapness and are shown at X on the various illustrations.

Assuming, for instance, that the motor M has been started up in the normal way by pressing the "start" button K and that a break occurs in any one of the phase leads anywhere on the supply side of the reactors—for example—in the lead L1 such as the blowing of a fuse, this results in the motor running on single phase and the load side three phase transformer G becomes on single phase also and due to the average rectified voltage from a single phase source being much lower than the three-phase equivalent there will be a partial collapse of the supplementary excitation—and in turn the feedback excitation to the reactor so that the impedance of same immediately rises and voltage is transferred to the latter from the motor. If the motor is loaded or partially loaded it will stop on phase failure in that, the decreasing impedance of the motor as voltage is transferred from it will cause the unbalanced condition of the circuit to become more balanced from a fault point-of-view in similar manner to that created by an unbalanced short circuit, as already explained. If, on the other hand, the motor M is running light when the phase failure occurs it will continue to run on single phase but at a reduced voltage due to the partial transfer of voltage from it to the reactor until load is applied up to say half load at which point it will drop out of step and shut down as the effect of the loading increases the transfer of voltage due to the unbalancing of the circuit becoming more balanced, as explained. The net result of the protective feature is that it prevents any thermal overloading of the motor windings which is its objective.

Phase failure protection is provided in the circuit on the supply side of the apparatus and up to the point where the primary windings of the load side three phase transformer G is connected to the reactors. If the protection is required right up to the motor it merely becomes necessary to connect the primary windings Gp of the transformer G to the motor terminals 20–21 and 22 as shown dotted in FIGURE 4.

What is claimed is:

1. A remote control device comprising a saturable reactor system having a supply side and a load side between which extends, a main circuit for connection in series with a load circuit for establishing and disestablishing a supply of A.C. power to the load circuit by varying the impedance of the main circuit under the control of supplementary excitation applied to excitation windings provided on the reactor system, said supplementary excitation being derived from two excitation sources, one source deriving supply from a rectifier sysem and transformer means connected to the supply side of the reactor system and the other source deriving supply from a rectifier system and transformer means connected to the load side of the reactor system, an interlocking circuit including the single pole contacts over a "start" push-button switch connected to the said two excitation sources so that said supply side source is operative in the excitation windings only when the said "start" push-button switch contacts are closed, said load side source providing a retaining source of excitation when said "start" contacts are broken.

2. A device as claimed in claim 1 wherein the supply side and load side sources of supply are interlocked in series when or whilst the "start" contacts are established so that they become additive as the supply voltage becomes transferred from the reactors to a motor as the load circuit thereby providing a boost which increases the accelerating torque of the motor by increasing the rate of transfer of the voltage from the reactors to the load.

3. A device as claimed in claim 1 wherein the supply side and load side sources of supply are interlocked in parallel when or whilst the "start" contacts are established.

4. A device as claimed in claim 1 wherein a variable resistance is provided in the supply side rectifier system through which the excitation current and hence the initial current to the load circuit may be varied by varying the value of the variable resistance, thus controlling the impedance level of the reactors during starting.

5. A device as claimed in claim 4 wherein a second variable resistance is provided in the load side rectifier system through which the impedance level of the reactors may be adjusted when running under load conditions thus enabling the voltage level across the motor under these conditions to be controlled.

6. A device as claimed in claim 1 for providing overload protection wherein an overload relay is arranged to break the excitation circuit of the reactor or reactors in event of overload.

7. A device as claimed in claim 1 wherein the supply side excitation is derived from current obtained from a secondary winding on the reactor.

8. A device as claimed in claim 1 in combination with an isolating switch having auxiliary contacts arranged to open in advance of the main contacts and arranged in the excitation circuit whereby the excitation circuit is broken before the main circuit ensuring that the impedance of the reactor has increased to a maximum to prevent load current being broken by the main contacts.

9. A device as claimed in claim 1 when arranged for operation on polyphase supply systems wherein the supply side and load side excitation supplies are derived from polyphase rectified sources, the load side sources include a polyphase transformer, the primary windings of which are connected in delta form as that phase failure causes a substantial reduction in the excitation applied to the reactor system.

10. A remote control device comprising a saturable reactor system having a supply side and a load side between which extends a main circuit for connection in series with a load circuit for establishing and disestablishing a supply of A.C. power to the load circuit by varying the impedance of the main circuit under the control of supplementary excitation applied to excitation windings provided on the reactor system, said supplementary excitation being derived from two excitation sources, one source deriving supply from a rectifier system and transformer means connected to the supply side of the reactor system and the other source deriving a supply from a rectifier system and transformer means connected to the load side of the reactor system, the said two sources of excitation supply being interlocked in series together with contacts of a starting push button switch so that the rectifier system of the load side source is employed as a continuity path for the supply side excitation during initial starting when the push button contacts are closed, there being provision of a rectifier for by-passing the contacts of the start push-button when the latter is released after starting thus maintaining the continuity in the excitation supply during the take over between the two sources of excitation supply.

11. A device as claimed in claim 10 wherein a variable resistance is provided through which the excitation current may be increased or decreased by means of which the "inching" current through the motor may be varied thus varying the torque provided for "inching," the starting and stopping of the motor both being under control of the "start" contact and the amount of motion provided by the motor being dependent upon the duration of time the start contact is made.

12. A remote control device for controlling an electric motor, comprising a saturable reactor system having a supply side and a load side between which extends a main circuit for connection in series with the motor load for establishing and disestablishing a supply to the motor load by varying the impedance of the main circuit under the control of supplementary excitation applied to excitation windings provided on the reactor system, said supplementary excitation being derived from two excitation sources, one source deriving supply from a rectifier system and transformer means connected to the supply side of the reactor system and the other source deriving supply from a rectifier system and transformer means connected to the load side of the reactor system, an interlocking circuit including the single pole contacts of a starting push-button switch connecting together said two excitation sources so that the supply side source is operative in the excitation windings only when the said push-button switch contacts are closed, said load side source providing a retaining source of excitation when said "start" contacts are broken, wherein a change-over switch is provided in the excitation circuit for changing over from the normal starting condition wherein the supply and load side excitation supplies are operative to an "inching" condition wherein the supply side excitation supply only is made available so as to enable the contacts to be used alternatively for "starting" or "inching."

References Cited by the Examiner
UNITED STATES PATENTS 2,798,170 7/57 Carlisle _____ 307—112
2,958,816 11/60 Fisher _____ 318—513

JOHN F. COUCH, Primary Examiner.

ORIS L. RADER, Examiner.